US012762999B2

(12) United States Patent
Yoo et al.

(10) Patent No.: US 12,762,999 B2
(45) Date of Patent: Oct. 13, 2026

(54) DISPLAY DEVICE AND DRIVING METHOD THEREOF

(71) Applicant: LG Display Co., Ltd., Seoul (KR)

(72) Inventors: Seungjin Yoo, Paju-si (KR); HyunSuk Lee, Paju-si (KR); Hyungi Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 71 days.

(21) Appl. No.: 18/660,039

(22) Filed: May 9, 2024

(65) Prior Publication Data

US 2025/0006114 A1 Jan. 2, 2025

(30) Foreign Application Priority Data

Jun. 30, 2023 (KR) ........................ 10-2023-0085161

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2310/0275* (2013.01)

(58) Field of Classification Search
CPC ............. G09G 3/32; G09G 2300/0842; G09G 2310/0267; G09G 2310/0275; G09G 3/3233; G09G 2310/08; G09G 2320/043
See application file for complete search history.

(56) References Cited

U.S. PATENT DOCUMENTS

| | | | | |
|---|---|---|---|---|
| 2021/0056910 A1* | 2/2021 | Chung | G09G 3/3225 |
| 2022/0199020 A1* | 6/2022 | You | G09G 3/3233 |
| 2023/0094280 A1* | 3/2023 | Lee | G09G 3/3233 345/691 |
| 2024/0029651 A1* | 1/2024 | Kim | G09G 3/3291 |
| 2024/0290284 A1* | 8/2024 | Jang | G09G 3/3266 |

FOREIGN PATENT DOCUMENTS

KR 20160080489 A 7/2016

* cited by examiner

*Primary Examiner* — Andrew Sasinowski
(74) *Attorney, Agent, or Firm* — Seed Intellectual Property Law Group LLP

(57) ABSTRACT

A display device and driving method thereof are disclosed. A display device is provided, which comprises a plurality of pixels and each of the plurality of pixels includes a first switching transistor operating depending on a scan signal, a second switching transistor operating depending on a sensing signal, a driving transistor including a gate electrode connected to a first node, a source electrode connected to a second node, and a drain electrode connected to a low potential voltage line, a light emitting device including an anode connected to a high potential voltage line and a cathode connected to the second node, and a storage capacitor connected between the first node and the second node.

15 Claims, 10 Drawing Sheets

DISPLAY DEVICE AND DRIVING METHOD THEREOF

CROSS-REFERENCE TO RELATED APPLICATIONS

This application claims the benefit of the Korean Patent Application No. 10-2023-0085161 filed on Jun. 30, 2023, which is hereby incorporated by reference as if fully set forth herein.

BACKGROUND

Technical Field

The present disclosure relates to a display device and a driving method thereof.

Description of the Related Art

In addition to the display screen of a television or monitor, a display device is widely used as a notebook computer, a tablet computer, a smart phone, a portable display device, and a portable information device display screen. Research and development of a light emitting diode display device using micro light emitting diodes have recently been carried out, and the light emitting diode display device is in the spotlight as next-generation displays because of their high definition and high reliability. In addition, since the light emitting diode display device can omit a backlight unit, research is also being conducted on a transparent display device capable of recognizing objects located on a lower surface of the display device.

The light emitting diode display device may display an image by adjusting an amount of current flowing through the light emitting diode through a driving thin film transistor.

BRIEF SUMMARY

Inventors recognized that since the driving transistor receives a driving voltage that is a DC voltage, a threshold voltage characteristic of the driving transistor may change due to deterioration. The present disclosure provides a display device that can, among others, compensate for changes in device properties while improving transparency and method for driving the same.

In accordance with an aspect of the present disclosure, a display device includes a display panel on which a gate line, a scan line, a data line, and a plurality of pixels are disposed, wherein each of the plurality of pixels includes a first switching transistor operating depending on a scan signal applied through the gate line, a second switching transistor operating depending on a sensing signal applied through the sensing line, a driving transistor including a gate electrode connected to a first node, a source electrode connected to a second node, and a drain electrode connected to a low potential voltage line that supplies a low potential voltage, a light emitting device including an anode connected to a high potential voltage line supplying a high potential voltage and a cathode connected to the second node, and a storage capacitor connected between the first node and the second node.

Also, in accordance with an aspect of the present disclosure, a method of driving a display device is provided. The display device includes a display panel on which a gate line, a sensing line, a data line, and a plurality of pixels are disposed. The method includes turning on a first switching transistor and a second switching transistor to initialize a voltage stored in a storage capacitor through an initialization voltage applied to the data line, during a first period, sensing a threshold voltage of a driving transistor during a second period, applying a data voltage to the data line during a third period, compensating the threshold voltage of the driving transistor during a fourth period and emitting light by a light emitting element during a fifth period.

DETAILED DESCRIPTION

Figure 1:
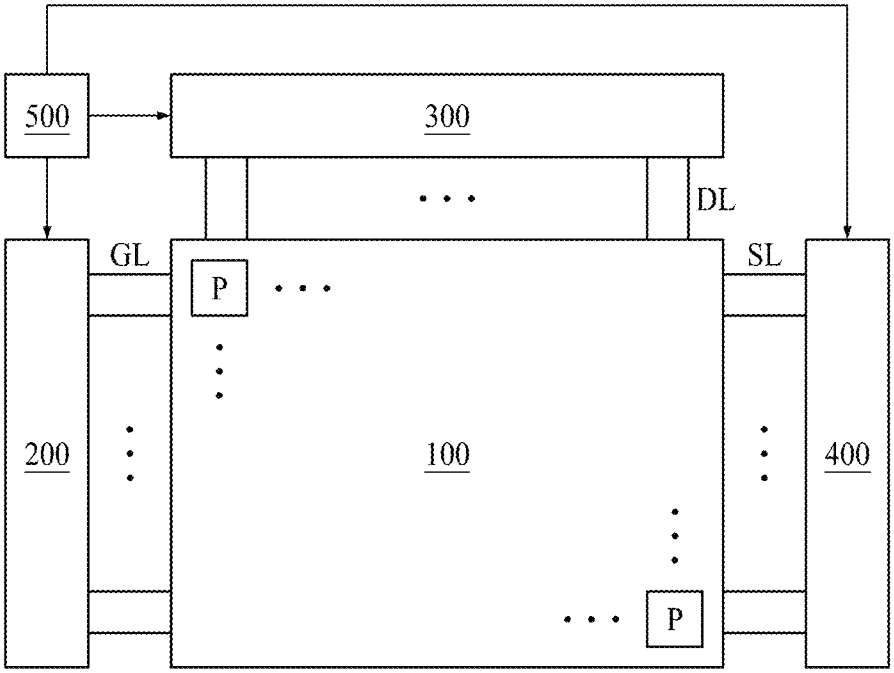
FIG. 1 is a block diagram illustrating a display device according to an embodiment of the present disclosure.

Characteristics and features of the present disclosure and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete and will fully convey the scope of the present disclosure to those skilled in the art . . . .

A shape, a size, a ratio, an angle and a number disclosed in the drawings for describing embodiments of the present disclosure are merely an example and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where 'comprise,' 'have' and 'include' described in the present disclosure are used, another portion may be added unless 'only~' is used. The terms of a singular form may include plural forms unless referred to the contrary.

In construing an element, the element is construed as including an error band although there is no explicit description.

In describing a position relationship, for example, when the position relationship is described as 'upon~,' 'above~,' 'below~' and 'next to~,' one or more portions may be disposed between two other portions unless 'just' or 'direct' is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various embodiments of the present disclosure may be partially or overall coupled to or combined with each other and may be variously inter-operated with each other and driven technically as those skilled in the art can sufficiently understand. The embodiments of the present disclosure may be carried out independently from each other or may be carried out together in a co-dependent relationship.

Hereinafter, the example embodiment of the present disclosure will be described in detail with reference to the accompanying drawings.

FIG. 1 is a block diagram of a display device according to an embodiment of the present disclosure.

Referring to FIG. 1, a display device according to an embodiment of the present disclosure may include a display panel 100, a gate driver 200, a data driver 300, a sensing driver 400, and a timing controller 500.

The display panel 100 may be a flat panel or a flexible display panel. A substrate of the display panel 100 may be formed of glass, plastic, or plastic film, but is not limited thereto. Also, when the display device is a transparent display device, the substrate of the display panel 100 may be formed of a transparent material.

The display panel 100 may include a pixel array in which a plurality of pixels P are arranged in a matrix form. Each of the plurality of pixels P may include a plurality of sub-pixels that individually include a light emitting element. Each pixel may be composed of three-color sub-pixels or four-color sub-pixels among a red sub-pixel emitting red light, a green sub-pixel emitting green light, a blue sub-pixel emitting blue light, and a white sub-pixel emitting white light, or may be composed of two-color sub-pixels. Also, when the display device is the transparent display device, each of the plurality of pixels P may include a transparent region.

Each of the plurality of pixels P is connected to a plurality of signal lines including a gate line driven by the gate driver 200, a data line driven by the data driver 300, a sensing line driven by the sensing driver 400, and a power line supplying a power voltage. Also, each of the plurality of pixels P may be driven independently by each pixel circuit.

A micro light emitting diode may be applied to the light emitting device disposed in the plurality of pixels P, but is not limited thereto.

The gate driver 200 may receive a plurality of gate control signals from the timing controller 500 and then individually drive the gate lines GL of the display panel 100.

The data driver 300 may receive a plurality of data control signals from the timing controller 500 and then individually drive the data lines DL of the display panel 100.

The sensing driver 300 may receive a plurality of sensing control signals from the timing controller 500 and then individually drive the sensing lines SL of the display panel 100.

The timing controller 500 may rearrange a digital video data input from the outside and supply the rearranged digital video data to the data driver 300. The timing controller 500 may control operation timings of the gate driver 200, the data driver 300, and the sensing driver 400 using timing signals such as a vertical synchronization signal, a horizontal synchronization signal, and a data enable signal input from the outside.

Figure 2:
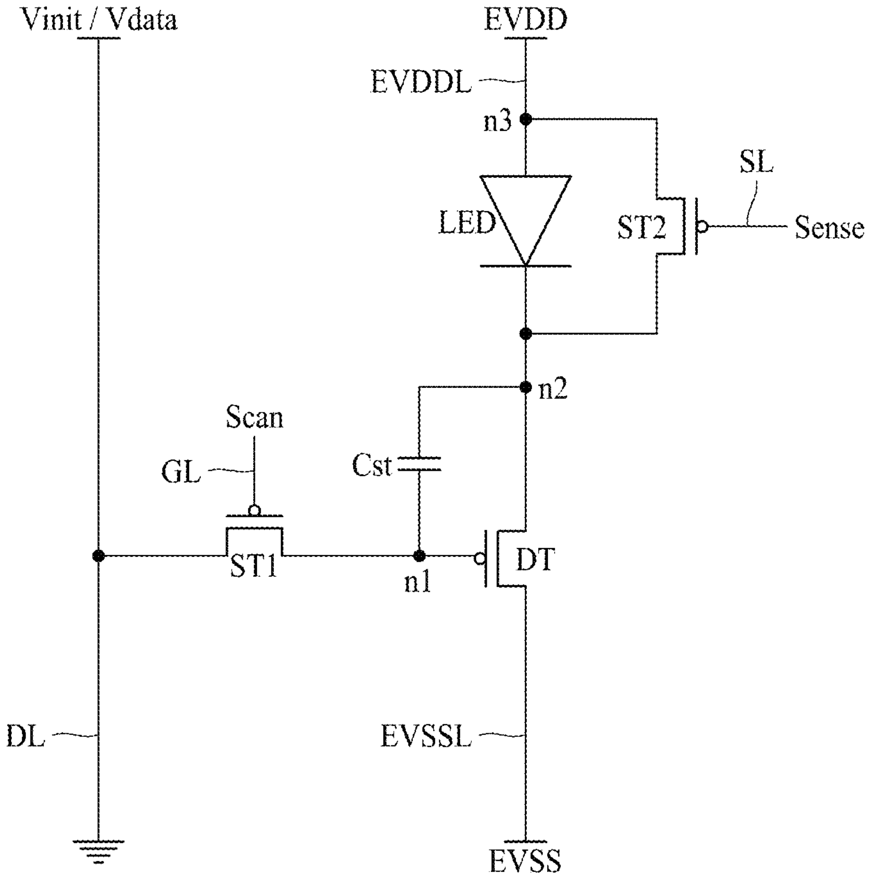
FIG. 2 is a circuit diagram of one pixel according to an embodiment of the present disclosure.

FIG. 2 is a circuit diagram of one-pixel P according to an embodiment of the present disclosure.

The pixel P may include a plurality of thin film transistors DT, ST1, and ST2, a light emitting element LED, and a storage capacitor Cst. The plurality of thin film transistors DT, ST1, and ST2 may include a driving transistor DT, a first switching transistor ST1, and a second switching transistor ST2. In this case, each of the driving transistor DT, the first switching transistor ST1, and the second switching transistor ST2 may be formed of a PMOS transistor.

A gate electrode of the first switching transistor ST1 may be connected to the gate line GL, a source electrode of the first switching transistor ST1 may be connected to the data line DL, and a drain electrode of the first switching transistor ST1 may be connected to a first node N1. The first switching transistor ST1 may operate depending on a scan signal Scan applied through the gate line GL. The first switching transistor ST1 may supply a, initialization voltage Vinit or a data voltage Vdata supplied through the data line DL to the first node n1.

A gate electrode of the second switching transistor ST2 may be connected to the sensing line SL, a source electrode of the second switching transistor ST2 may be connected to a third node N3, and a drain electrode of the second switching transistor ST2 may be connected to a second node N2. The second switching transistor ST2 may operate depending on a sensing signal Sense applied through the sensing line SL.

A gate electrode of the driving transistor DT may be connected to the first node n1, the source electrode of the driving transistor DT may be connected to the second node n2, and the drain electrode of the driving transistor DT may be connected to a low potential voltage line EVSSL. The driving transistor DT may control a magnitude of a driving current I flowing to the light emitting element LED.

An anode of the light emitting element LED may be connected to a third node N3, and a cathode of the light emitting element LED electrode may be connected to a second node N2. The anode of the light emitting element LED may be connected to a source electrode of the second switching transistor ST2 through the third node N3, and the cathode may be connected to a drain electrode of the second switching transistor ST2 through the second node N2. Also, the light emitting element LED may be a micro light emitting diode, but is not limited thereto. The light emitting element LED may emit light depending on the driving current I.

The storage capacitor Cst may be connected to the first node N1 and the second node N2. The storage capacitor Cst may maintain the data voltage Vdata applied to the first node N1 for a predetermined period.

Figure 3:
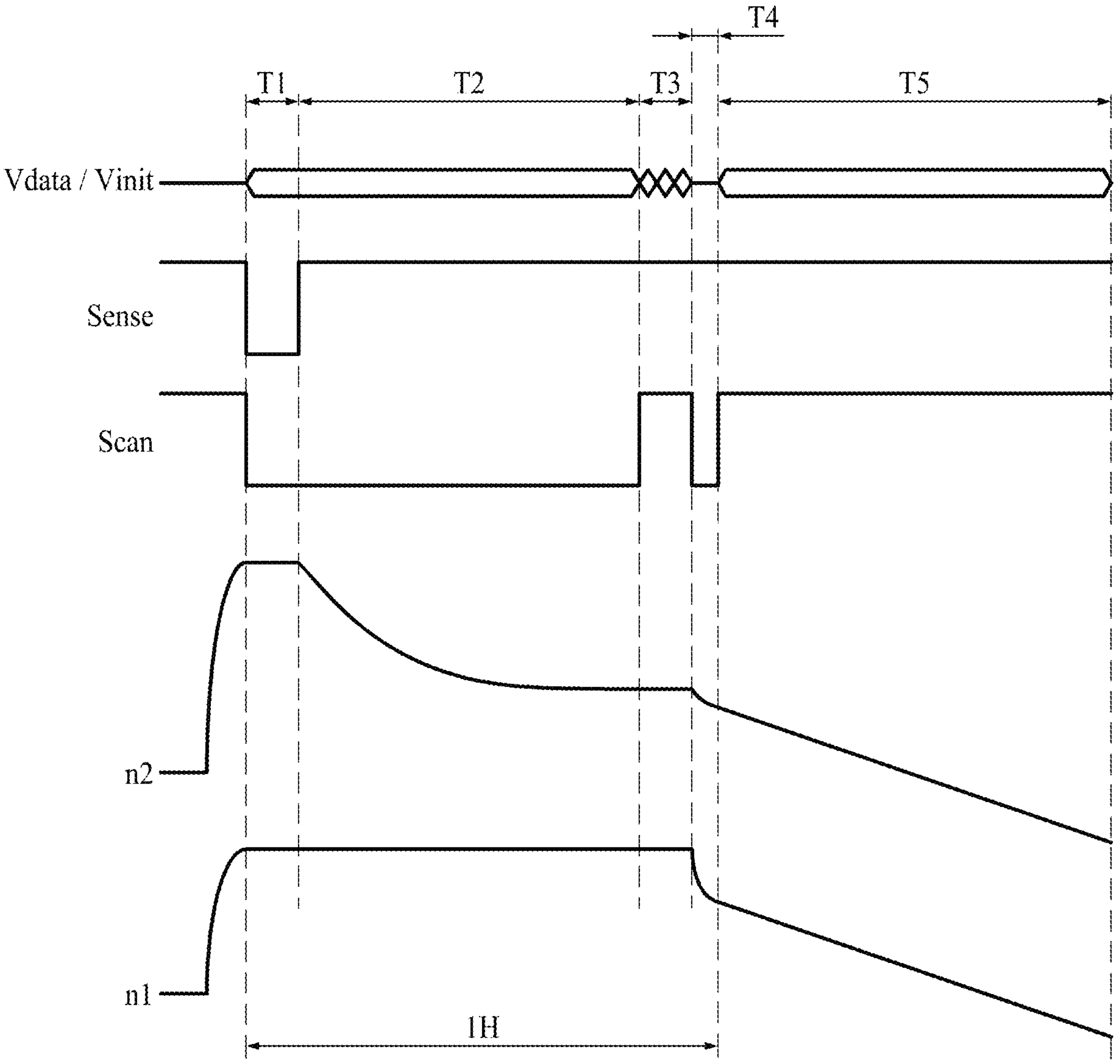
FIG. 3 is a diagram of a waveform of a signal applied to a pixel according to an embodiment of the present disclosure.

FIG. 3 is a diagram of waveforms of signals applied to a pixel P according to an embodiment of the present disclosure. The plurality of pixels P may be driven according to a first period T1, a second period T2, a third period T3, a fourth period T4 and a fifth period T5. The first to fifth periods T1 to T5 (T1, T2, T3, T4, and T5) do not overlap each other, but may be continuous or consecutive to one another. In this case, a first horizontal period H1 may include first to fourth periods T1 to T4. Referring to FIGS. 4 to 8, a driving process of the pixel P will be described in detail.

Figure 4:
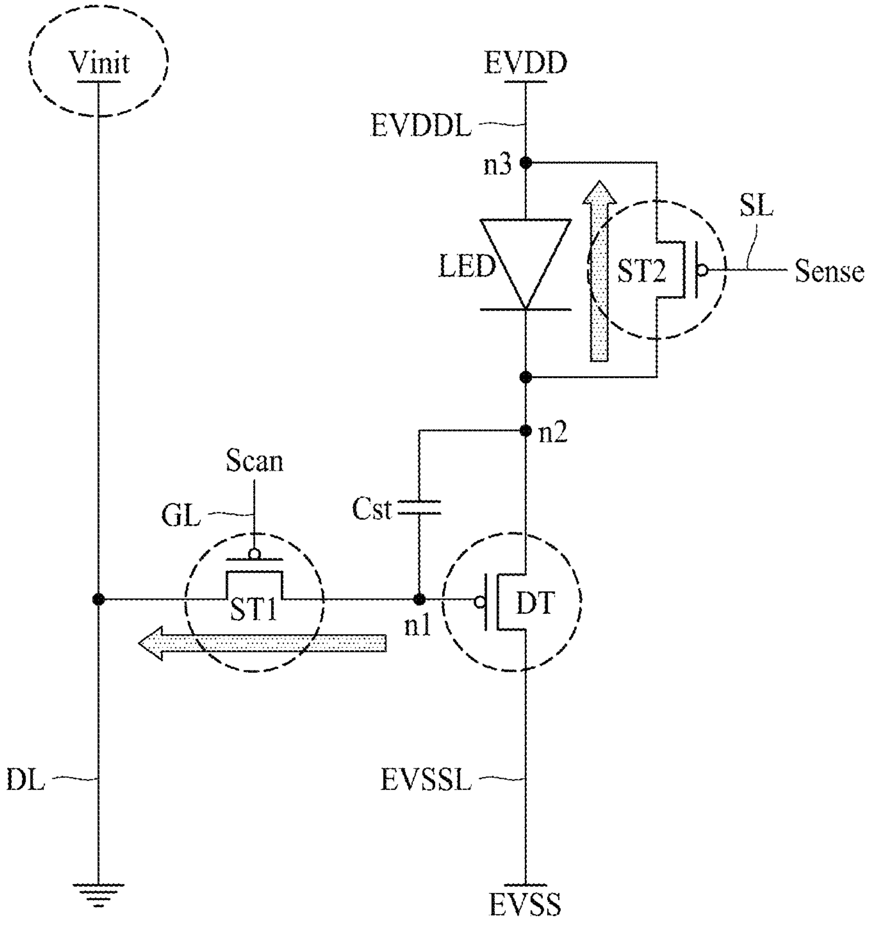
FIG. 4 is a circuit diagram illustrating driving of a pixel in a first period according to an embodiment of the present disclosure.

FIG. 4 is a circuit diagram illustrating driving of a pixel in a first period T1 according to an embodiment of the present disclosure. The first period T1 may be a reset period.

In a first period T1, the scan signal Scan and the sensing signal Sense in a low voltage state are applied, and thus the first and second switching transistors ST1 and ST2 may be in a turn-on state. An initialization voltage Vinit applied to the data line DL through the first switching transistor ST1 may be applied to the first node n1. In addition, the high potential voltage EVDD may be applied to the second node n2 through the second switching transistor ST2. Since a first terminal of the storage capacitor Cst are respectively connected to the first node n1, the first terminal of the storage capacitor Cst may be initialized to the initialization voltage Vinit. Also, since a second terminal of the storage capacitor Cst are respectively connected to the second node n2, the second terminal of the storage capacitor Cst may be initialized to the high potential voltage EVDD.

Therefore, the storage capacitor Cst may be initialized to a difference voltage between the initialization voltage Vinit and the high potential voltage EVDD. For example, a wiring for supplying a reference voltage may not be additionally used by initializing the storage capacitor Cst through the initialization voltage Vinit supplied through the data line DL and the high potential voltage EVDD supplied through the high potential voltage line EVDDL. Accordingly, the number of wirings in the pixel circuit may be reduced, thereby improving the transmittance.

Also, in the first period T1, the driving transistor DT may be turned on by the initialization voltage Vinit applied to the first node N1 and the high potential voltage EVDD applied to the second node n2. Also, the anode and the cathode of the light emitting element LED may be short-circuited. The current supplied from the high potential voltage line EVDDL may flow through the high potential voltage line EVDDL, the second switching transistor ST2, the driving transistor DT, the first switching transistor ST1, and the data line DL. Since no current flows through the light emitting element LED, the light emitting element LED may not emit light in the first period T1.

Figure 5:
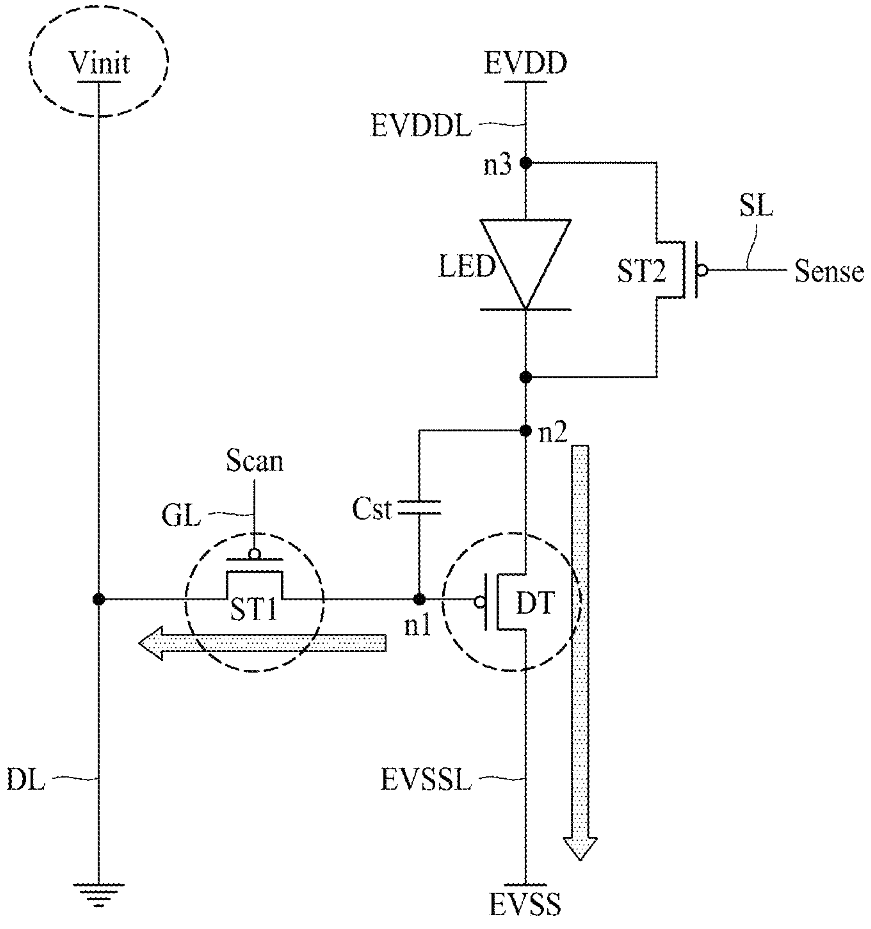
FIG. 5 is a circuit diagram illustrating driving of a pixel in a second period according to an embodiment of the present disclosure.

FIG. 5 is a circuit diagram illustrating driving of a pixel in a second period T2 according to an embodiment of the present disclosure. The second period T2 may be a sensing period.

In a second period T2, the scan signal Scan supplied to the first switching transistor ST1 may maintain the low voltage state, and the sensing signal Sense supplied to the second switching transistor ST2 may change from the low voltage state to the high voltage state. Accordingly, the first switching transistor ST1 may maintain the turn-on state, and the second switching transistor ST2 may change from a turn-on state to a turn-off state.

The second switching transistor ST2 is changed to the turn-off state, and the driving transistor DT may operate as a source follower. For example, the voltage of the second node n2 connected to the source electrode of the driving transistor DT may be discharged through the low potential voltage line EVSSL. Meanwhile, the first node n1 connected to the gate electrode of the driving transistor DT may maintain the initialization voltage Vinit.

Since the voltage of the gate electrode of the driving transistor DT is maintained and the voltage of the source electrode of the driving transistor DT is decreased, the gate-source voltage Vgs of the driving transistor DT may be decreased. When the gate-source voltage Vgs of the driving transistor DT is decreased to the threshold voltage Vth of the driving transistor DT, the driving transistor DT may be turned off. Also, since the storage capacitor Cst stores the differential voltage, difference in voltage between the first terminal of the storage capacitor Cst and the second terminal of the storage capacitor Cst, the storage capacitor Cst may store the threshold voltage Vth, which is the gate-source voltage Vgs of the driving transistor DT.

In the second period T2, a magnitude of the gate voltage of the driving transistor DT may be Vinit. And, a magnitude of the source voltage of the driving transistor DT may be Vinit+|Vth|. And, a magnitude of the voltage potential stored in the storage capacitor Cst may be |Vth|. The threshold voltage Vth is sensed in the second period T2 through the voltage potential stored in the storage capacitor Cst.

The light emitting diode LED may not emit light even in the second period T2.

Figure 6:
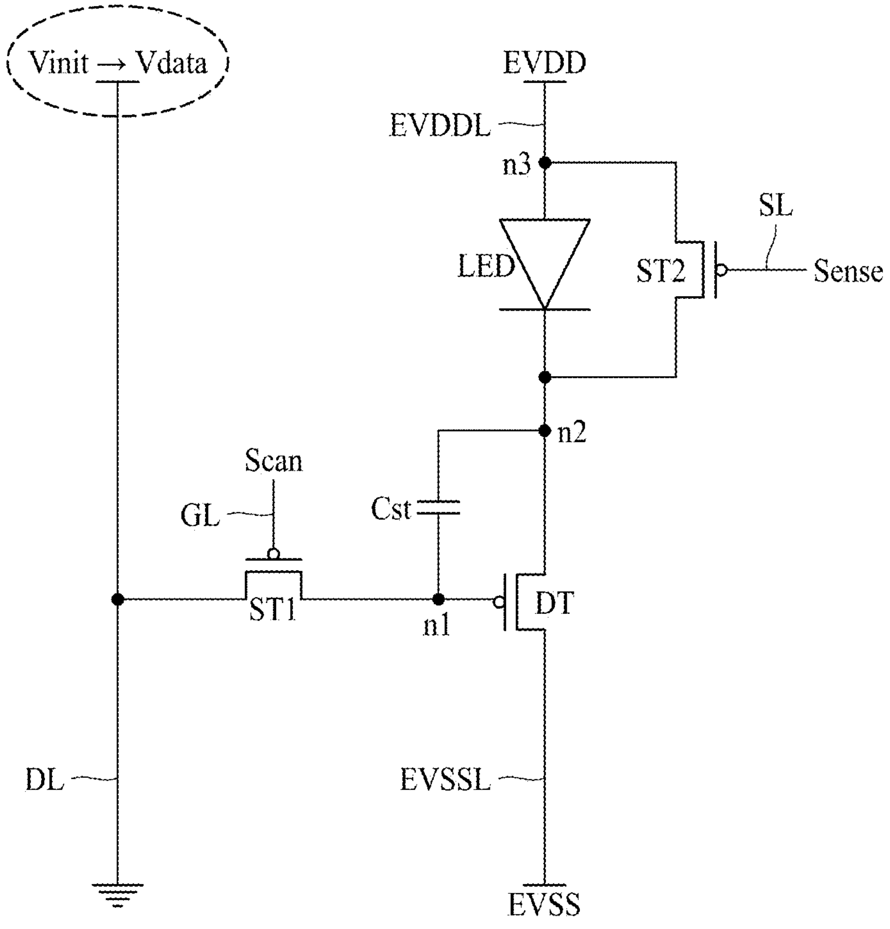
FIG. 6 is a circuit diagram illustrating driving of a pixel in a third period according to an embodiment of the present disclosure.

FIG. 6 is a circuit diagram illustrating driving of a pixel in a third period T3 according to an embodiment of the present disclosure. The third period T3 may be a data transition period.

In the third period T3, the scan signal Scan supplied to the first switching transistor ST1 may change from a low voltage state to a high voltage state, and the sensing signal Sense supplied to the second switching transistor ST2 may maintain the high voltage state. Accordingly, the first switching transistor ST1 may change from the turn-on state to the turn-off state, and the second switching transistor ST2 may maintain the turn-off state. Since the gate-source voltage Vgs of the driving transistor DT is not changed, the storage capacitor Cst may maintain the state in which the threshold voltage Vth of the driving transistor DT is stored.

Also, in the third period T3, the voltage applied to the data line DL may be changed from the initialization voltage Vinit to the data voltage Vdata. By supplying both the initialization voltage Vinit and the data voltage Vdata through the data line DL, the initialization voltage Vinit and the data voltage Vdata may not be supplied through different wires. Therefore, a number of wires may be reduced. In this case, a magnitude of the data voltage Vdata may be less than a magnitude of the initialization voltage Vinit.

Figure 7:
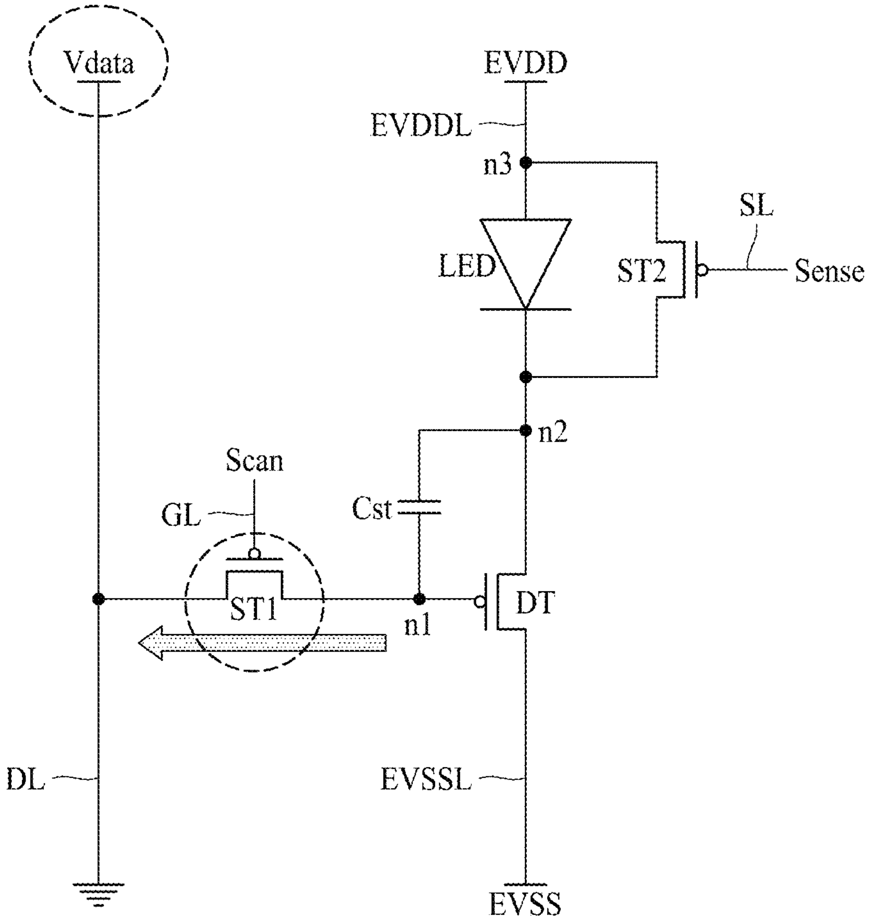
FIG. 7 is a circuit diagram illustrating driving of a pixel in a fourth period according to an embodiment of the present disclosure.

FIG. 7 is a circuit diagram illustrating driving of a pixel in a fourth period T4 according to an embodiment of the present disclosure. The fourth period T4 may be a write period.

In the fourth period T4, the scan signal Scan supplied to the first switching transistor ST1 may change from the high voltage state to the low voltage state, and the sensing signal Sense supplied to the second switching transistor ST2 may maintain the high voltage state. The first switching transistor ST1 may change from the turn-off state to the turn-on state, and the second switching transistor ST2 may maintain the turn-off state. The fourth period T4 may be shorter than the first period T1 or the third period T3.

Since the first switching transistor ST1 is in the turn-on state, the data voltage Vdata applied to the data line DL may be applied to the first node n1 through the first switching transistor ST1. As such, both the initialization voltage Vinit and the data voltage Vdata can be supplied through the first switching transistor ST1, the initialization voltage Vinit and the data voltage Vdata may not be supplied through different switching transistors. Accordingly, a number of transistors in the pixel circuit may be reduced, and thus, the transmittance may be improved.

Also, the data voltage Vdata is applied to the first node n1 through the first switching transistor ST1, and the gate voltage of the driving transistor DT connected to the first node n1 may be reduced from the initialization voltage Vinit to the data voltage Vdata. For example, a voltage of the first node n1 may be reduced by 'Vinit-Vdata.'

A voltage change amount of the first node n1 may be reflected in the second node n2 by the storage capacitor Cst, 'Vinit-Vdata', which is the voltage change amount of the first node n1 may be reflected in the second node n2. In this case, since the second node n2 is connected between the storage capacitor Cst and the light emitting element LED, the voltage of the second node n2 may be reduced by a portion of 'Vinit-Vdata' due to the coupling effect. Specifically, the voltage change amount may be reflected in the second node n2 at a ratio of a as shown in Equation 1 below. In Equation 1, C1 may be a capacity of a storage capacitor Cst, and C2 may be a capacity of the light emitting element LED.

$$\alpha = \frac{C1}{C1 + C2} \qquad \text{Equation 1}$$

As such, the voltage of the second node n2 is reduced by α(Vinit−Vdata), and thus the voltage of the second node n2 may be 'Vinit+|Vth|−α (Vinit−Vdata)'. Finally, the magnitude of the gate-source voltage Vgs of the driving transistor DT is shown in Equation 2 below. In this case, β may be 1−α. β may be $$\frac{C2}{C1 + C2}.$$

The gate-source voltage Vgs of Equation 2 below may be stored in the storage capacitor Cst.

$$Vgs = Vth + \beta(Vinit - Vdata) \qquad \text{Equation 2}$$

As such, the threshold voltage Vth of the driving transistor is compensated by an amount of β(Vinit−Vdata).

Figure 8:
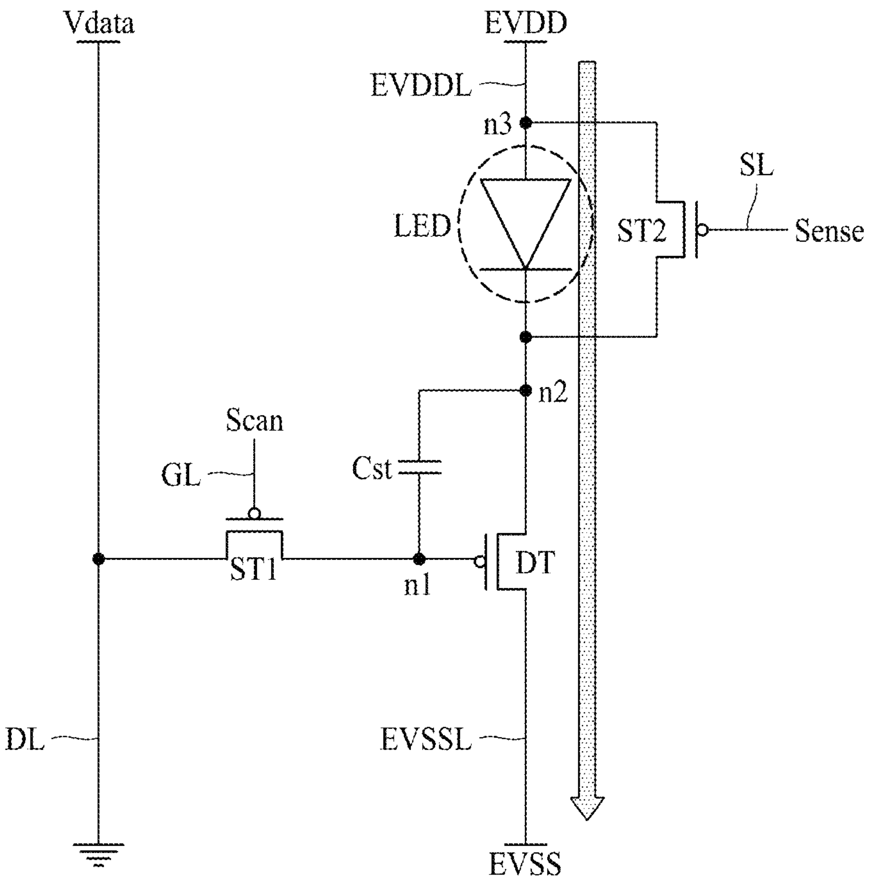
FIG. 8 is a circuit diagram illustrating driving of a pixel in a fifth period according to an embodiment of the present disclosure.

FIG. 8 is a circuit diagram illustrating driving of a pixel in a fifth period according to an embodiment of the present disclosure. The fifth period T5 may be an emission period.

In a fifth period T5, the scan signal Scan supplied to the first switching transistor ST1 may change from the low voltage state to the high voltage state, and the sensing signal Sense supplied to the second switching transistor ST2 may maintain the high voltage state. The first switching transistor ST1 may change from the turn-on state to the turn-off state, and the second switching transistor ST2 may maintain the turn-off state.

Since the first switching transistors ST1 and the second switching transistors ST2 are in the turn-off state, the current I corresponding to the gate-source voltage Vgs of the driving transistor DT may flow through the light emitting diode LED. The light emitting diode LED may emit light. The gate-source voltage Vgs of the driving transistor DT may be maintained for 1 frame by the storage capacitor Cst.

Meanwhile, the current I of the driving transistor DT supplied to the LED is shown in Equation 3 below. In Equation 3 below, k may be a proportional coefficient determined by a structure and a physical characteristic of the driving transistor DT. The proportional coefficient may be determined by an electron mobility, a channel width, a channel length, and the like of the driving transistor DT.

$$I = k(Vgs - Vth)^2 \qquad \text{Equation 3}$$

When the gate-source voltage Vgs derived from Equation 2 described above is reflected in Equation 3, Equation 4 below may be derived.

$$I = k\{\beta(Vinit - Vdata)\}^2 \qquad \text{Equation 4}$$

Referring to Equation 4, the current I of the driving transistor DT supplied to the light emitting element LED may not be affected by the threshold voltage Vth and may be determined by the capacity of the storage capacitor C1, the initialization voltage Vinit, and the data voltage Vdata. By adjusting the capacity of the storage capacitor C1 of Cst, the initialization voltage Vinit, or the data voltage Vdata, the threshold voltage Vth of the driving transistor DT may be compensated at a predetermined ratio.

As described herein, even though the characteristic of the threshold voltage Vth of the driving transistor DT is changed due to a deterioration, a deviation of the current I of the driving transistor DT supplied to the light emitting diode LED may be prevented. Therefore, a reduction of image quality due to the characteristic change of the threshold voltage Vth may be prevented.

In conclusion, the present disclosure has the effect of improving transmittance by reducing the number of transistors and the number of wirings while preventing the reduction of image quality due to changes in the characteristics of the threshold voltage Vth.

Figure 9:
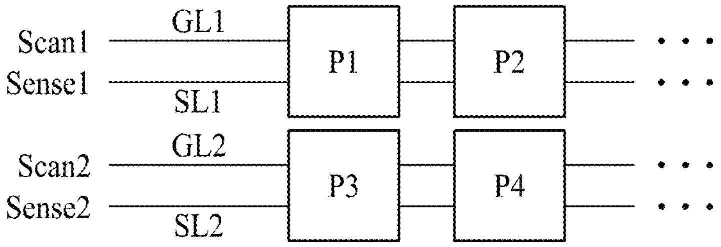
FIG. 9 is a block diagram of a plurality of pixels according to a first embodiments of the present disclosure and a second embodiments of the present disclosure.

FIG. 9 is a block diagram of a plurality of pixels according to a first embodiments of the present disclosure and a second embodiments of the present disclosure.

Referring to FIG. 9, FIG. 9 illustrates a first pixel P1, a second pixel P2, a third pixel P3 and a fourth P4 among the plurality of pixels. In this case, the plurality of pixels may be arranged in a matrix form. Specifically, the first and second pixels P1 and P2 may be arranged in the same row, and the third and fourth pixels P3 and P4 may be arranged in the same row. Also, the first and third pixels P1 and P3 may be arranged in the same column, and the second and fourth pixels P2 and P4 may be arranged in the same column.

A first scan signal Scan1 may be applied to the first and second pixels P1 and P2 through a first gate line GL1, and a second scan signal Scan2 may be applied to the third and fourth pixels P3 and P4 through a second gate line GL2. Also, a first sensing signal Sense1 may be applied to the first and second pixels P1 and P2 through a first sensing line SL1, and a second sensing signal Sense2 may be applied to the third and fourth pixels P3 and P4 through a second sensing line SL2. One gate line GL may apply the scan signal Scan to pixels arranged in the same row, and one sensing line SL may apply the sensing signal Sense to pixels arranged in the same row.

Figure 10:
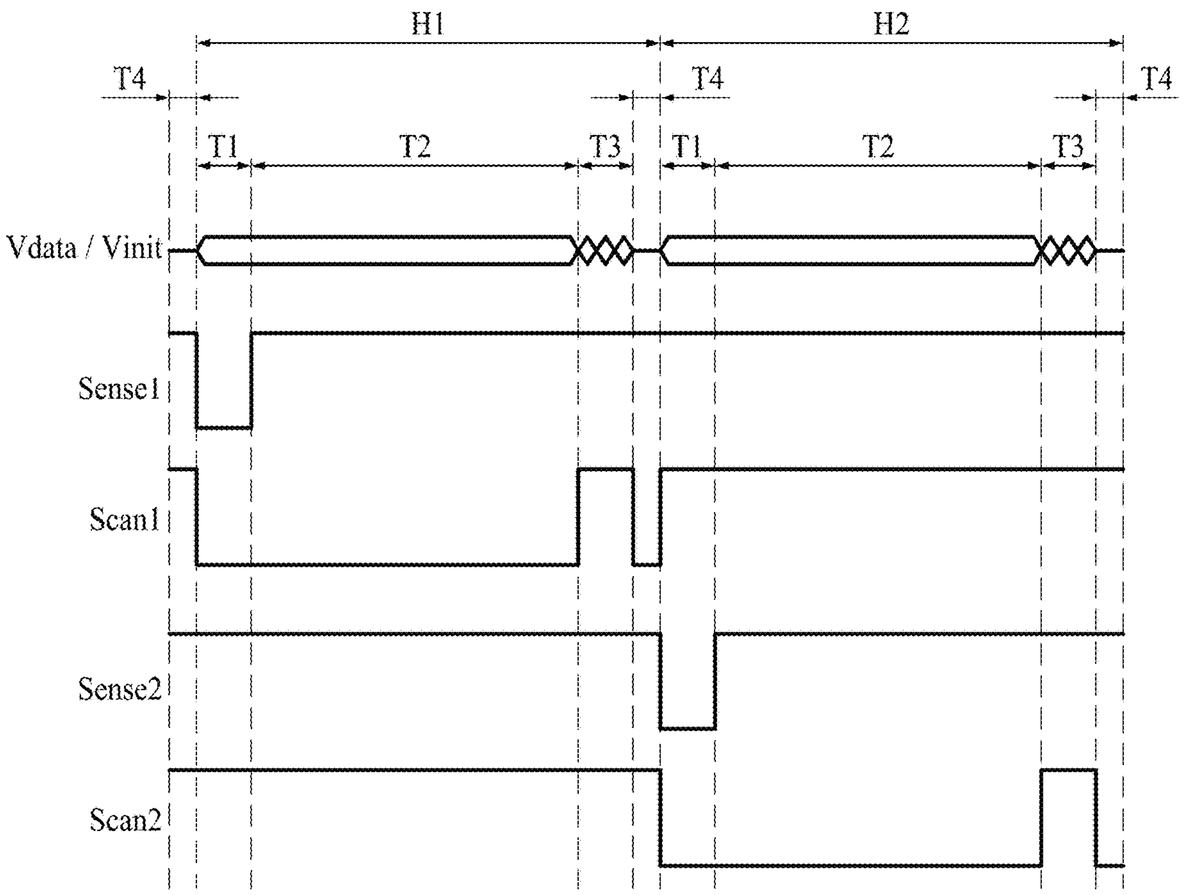
FIG. 10 is a diagram of waveforms of a signal in a first horizontal period and a second horizontal period according to a first embodiment of the present disclosure.

FIG. 10 is a diagram of waveforms of a signal in a first horizontal period and a second horizontal period according to a first embodiment of the present disclosure.

Referring to FIG. 10, each of a first horizontal period H1 and a second horizontal period H2 may include the first to fourth periods T1 to T4 described in FIGS. 3 to 8. As described above, each of the first to fourth periods T1 to T4 may be the reset period, the sensing period, the data transition period, and the write period. Also, the second horizontal period H2 may not overlap or be spaced apart from the first horizontal period H1, but may be continuous or consecutive with the first horizontal period H1.

In the first horizontal period H1, voltage states of the first scan signal Scan1 and the first sensing signal Sense1 may change. Specifically, the first sensing signal Sense1 may be in a low voltage state in the first period T1, and may be in a high voltage state in the second to fourth periods T2-T4. Also, the first scan signal Scan1 may be in a low voltage state in the first, second, and fourth periods T1, T2, and T4, and may be in a high voltage state in the third period T3. Also, in the first horizontal period H1, the second scan signal Scan2 and the second sensing signal Sense2 may maintain a high voltage state. In the first horizontal period H1, the first and second pixels P1 and P2 may be driven depending on voltage states of the first scan signal Scan1 and the first sensing signal Sense1, and the third and fourth pixels P3 and P4 may not be driven.

Also, In the second horizontal period H2, voltage states of the second scan signal Scan2 and the second sensing signal Sense2 may change. Specifically, the second sensing signal Sense2 may be in a low voltage state in the first period T1 and may be in a high voltage state in the second to fourth periods T2-T4. Also, the second scan signal Scan2 may be in a low voltage state in the first, second, and fourth periods T1, T2, and T4, and may be in a high voltage state in the third period T3. Also, in the second horizontal period H2, the first scan signal Scan1 and the first sensing signal Sense1 may maintain a high voltage state. In the second horizontal period H2, the third and fourth pixels P3 and P4 may be driven depending on voltage states of the second scan signal Scan2 and the second sensing signal Sense2, and the first and second pixels P1 and P2 may not be driven.

Accordingly, pixels arranged in the same row may be driven according to the first to fourth periods T1 to T4 in one horizontal period. Accordingly, pixels arranged in the same row may perform a sensing period and a writing period in one horizontal period.

Figure 11:
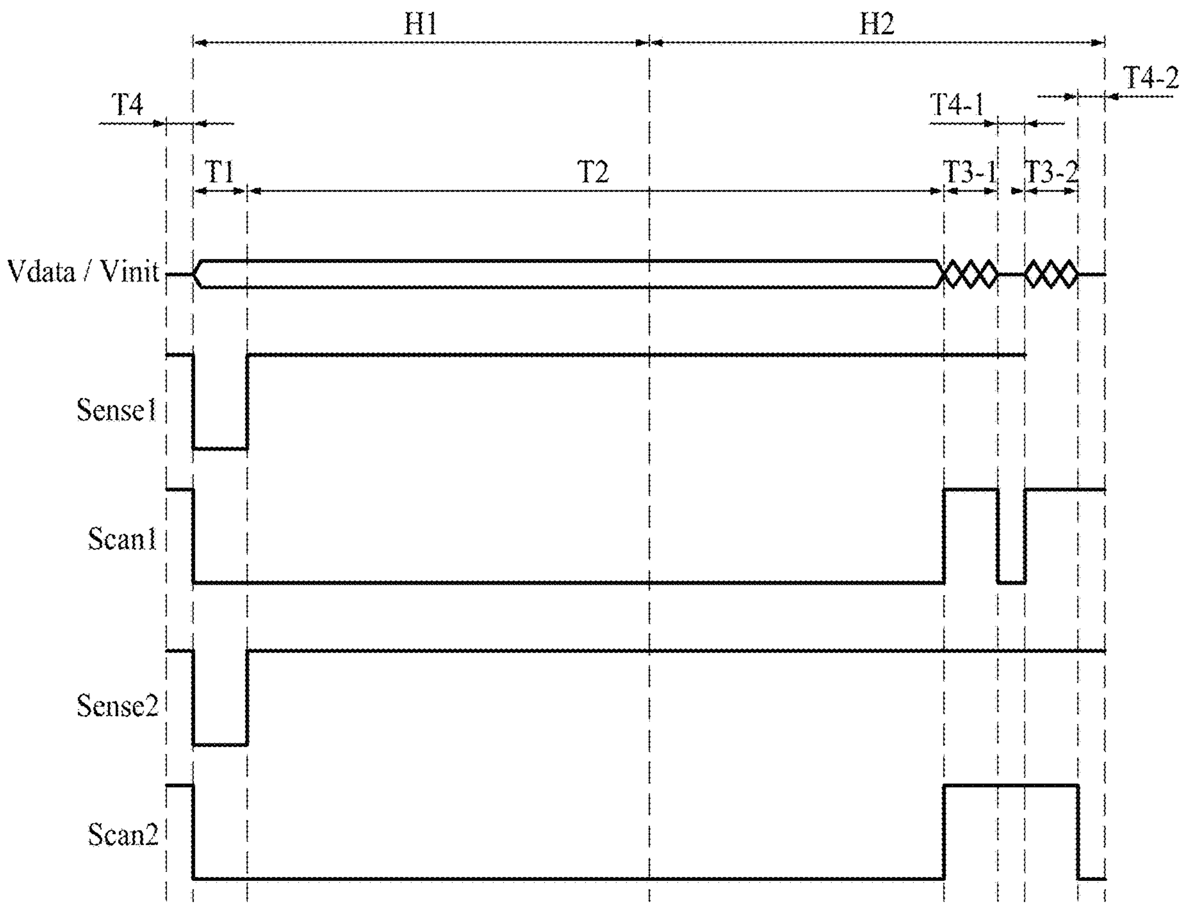
FIG. 11 is a diagram of waveforms of a signal in a first horizontal period and a second horizontal period according to a second embodiment of the present disclosure.

FIG. 11 is a diagram of waveforms of a signal in a first horizontal period and a second horizontal period according to a second embodiment of the present disclosure.

Referring to FIG. 11, the first horizontal period H1 may include first and second periods T1 and T2, and the second horizontal period H2 may include second to fourth periods T2-T4. Also, the third period T3 includes a 3-1th period T3-1 and a 3-2th period T3-2, the fourth period T4 may include a 4-1th period T4-1 and a 4-2th period T4-2. As described above, each of the first to fourth periods T1-T4 may be the reset period, the sensing period, the data transition period, and the write period.

Also, the second horizontal period H2 may not overlap or be spaced apart from the first horizontal period H1, but may be continuous with or consecutive to the first horizontal period H1. The second period T2 of the first horizontal period H1 and the second period T2 of the second horizontal period H2 may be continuous or consecutive to one another.

In the first horizontal period H1, voltage states of the first and second scan signals Scan1 and Scan2 and voltage states of the first and second sensing signals Sense1 and Sense2 may change. Specifically, the first and second sensing signals Sense1 and Sense2 may be in a low voltage state in the first period T1 and may be in a high voltage state in the second period T2. Also, the first and second scan signals Scan1 and Scan2 may be in a low voltage state in the first horizontal period H1.

In the first horizontal period H1, since the voltage states of the first and second scan signals Scan1 and Scan2 and the first and second sensing signals Sense1 and Sense2 are equally changed, the first to fourth pixels P1 to P4 may be simultaneously driven. Accordingly, in the first horizontal period H1, the first to fourth pixels P1 to P4 may simultaneously perform the sensing period.

Also, the voltage states of the first and second scan signals Scan1 and Scan2 may change in the second horizontal period H2. In detail, the first scan signal Scan1 may be a low voltage state in the second period T2 and the 4-1th period T4-1, and may be a high voltage state in the 3-1th period T3-1, the 3-2th period T3-2, and the 4-2th period T4-2. Also, the second scan signal Scan2 may be a low voltage state in the second period T2 and the 4-2th period T4-2, and may be a high voltage state in the 3-1 period T3-1, the 4-1 period T4-1, and the 3-2 period T3-2. Also, in the second horizontal period H2, the first and second sensing signals Sense1 and Sense2 may maintain the high voltage state.

Like the first horizontal period H1, in the second horizontal period H2, the first to fourth pixels P1 to P4 may simultaneously perform the sensing period. In this case, since the first and second horizontal periods H1 and H2 continue, the sensing period may also be continuously performed. Also, the first and second pixels P1 and P2 may perform a write period in the 4-1th period T4-1, and the third and fourth pixels P3 and P4 may perform a write period in the 4-2th period T4-2.

In the second embodiment, after the sensing periods of the first to fourth pixels P1-P4 are simultaneously performed, write periods of the first and second pixels P1 and P2 connected to the first scan signal Scan1 and the first sensing signal Sense1 and write periods of the third and fourth pixels P3 and P4 connected to the second scan signal Scan2 and the second sensing signal Sense2 may be sequentially performed.

Compared with the first embodiment, the second embodiment may increase the length of the sensing periods of the first to fourth pixels P1-P4 by continuously performing sensing periods in the first and second horizontal periods H1 and H2. Also, although FIG. 11 shows that the sensing period is continuous for two horizontal periods, but is not limited thereto. For example, the sensing period may be continuous for three or more horizontal periods.

Figure 12:
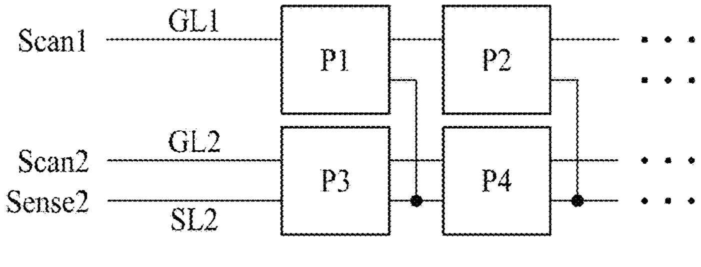
FIG. 12 is a block diagram of a plurality of pixels according to a third embodiment of the present disclosure.

Meanwhile, as described above in FIG. 11, in the second embodiment, voltage states of the first and second sensing signals Sense1 and Sense2 may be equally changed during the first and second horizontal periods H1 and H2. As shown in FIG. 12, the structure of the sensing line SL may be changed.

In detail, FIG. 12 is a block diagram of a plurality of pixels according to a third embodiment of the present disclosure. Referring to FIG. 12, the first sensing signal Sense1 may be omitted, and the second sensing signal Sense2 may be applied to all of the first to fourth pixels P1-P4. In this case, the third and fourth pixels P3 and P4 may directly receive the second sensing signal Sense2 from the second sensing line SL2, and the first and second pixels P1 and P2 may receive the second sensing signal Sense2 through a wiring connected to the second sensing line SL2 in the panel.

Therefore, compared to the first and second embodiments, the third embodiment may further improve the transmittance of pixels by reducing the number of sensing lines SL.

According to the present disclosure, the following advantageous effects may be obtained.

According to the present disclosure, the plurality of light conversion layers may be formed so that light efficiency may be improved, and reflectance due to external light may be reduced.

It will be apparent to those skilled in the art that the present disclosure described above is not limited by the above-described embodiments and the accompanying drawings and that various substitutions, modifications and variations can be made in the present disclosure without departing from the spirit or scope of the disclosures. Consequently, the scope of the present disclosure include those of the accompanying claims and it is intended that all variations or modifications derived from the meaning, scope and equivalent concept of the claims fall within the scope of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of driving a display device including a display panel on which a gate line, a sensing line, a data line, and a plurality of pixels are disposed, the method comprising:

turning on a first switching transistor and a second switching transistor to initialize a voltage stored in a storage capacitor through an initialization voltage applied to the data line, during a first period, sensing a threshold voltage of a driving transistor during a second period, applying a data voltage to the data line during a third period, compensating the threshold voltage of the driving transistor during a fourth period, and emitting light by a light emitting element during a fifth period.

2. The method of driving the display device of claim 1, wherein in the first period, the initialization voltage applied to the data line is supplied to a gate electrode of the driving transistor through the first switching transistor, a high potential voltage is supplied to a source electrode of the driving transistor through the second switching transistor, and the storage capacitor is initialized to a differential voltage between the initialization voltage and the high potential voltage.

3. The method of driving the display device of claim 1, wherein in the second period, the first switching transistor maintains a turn-on state, the second switching transistor changes from a turn-on state to a turn-off state, a voltage of the gate electrode of the driving transistor is maintained, and a voltage of the source electrode of the driving transistor decreases.

4. The method of driving the display device of claim 3, wherein a magnitude of a gate-source voltage of the driving transistor is equal to a magnitude of a threshold voltage of the driving transistor in the second period.

5. The method of driving the display device of claim 3, wherein the storage capacitor stores the threshold voltage of the driving transistor in the second period.

6. The method of driving the display device of claim 1, wherein in the third period, the first switching transistor changes from a turn-on state to a turn-off state, the second switching transistor maintains a turn-off state, and the data voltage different from the initialization voltage is applied to the data line.

7. The method of driving the display device of claim 1, wherein in the fourth period, the first switching transistor changes from a turn-off state to a turn-on state, the second switching transistor maintains a turn-off state, and the data voltage applied to the data line through the first switching transistor is supplied to a gate electrode of the driving transistor.

8. The method of driving the display device of claim 1, wherein in the fifth period, the first switching transistor changes from a turn-on state to a turn-off state, the second switching transistor maintains a turn-off state, and the light emitting element emits light according to a current having a current value based on the initialization voltage and the data voltage.

9. The method of driving the display device of claim 1, wherein the first period, the second period, the third period and the fourth period are included in each of a first horizontal period and a second horizontal period, and the first horizontal period and the second horizontal period are consecutive.

10. The method of driving the display device of claim 9, wherein the first period, the second period, the third period, and the fourth period are consecutive.

11. The method of driving the display device of claim 9, wherein the plurality of pixels includes a first pixel, a second pixel, a third pixel, and fourth pixel, the gate line includes a first gate line and a second gate line, the sensing line includes a first sensing line and a second sensing line, the first gate line and the first sensing line supply signals to the first pixel and the second pixel in the first horizontal period, and the second gate line and the second sensing line supply signals to the third pixel and the fourth pixel in the second horizontal period.

12. The method of driving the display device of claim 1, wherein the first period and the second period are included in a first horizontal period, the second period, the third period and the fourth period are included in a second horizontal period, and the first horizontal period and the second horizontal period are consecutive.

13. The method of driving the display device of claim 12, wherein the plurality of pixels includes a first pixel, a second pixel, a third pixel, and fourth pixel, the gate line includes a first gate line and a second gate line, and the sensing line includes a first sensing line and a second sensing line, wherein in the first horizontal period, the first gate line and the first sensing line supply signals to the first pixel and the second pixel, and the second gate line and the second sensing line supply signals to the third pixel and the fourth pixel.

14. The method of driving the display device of claim 13, wherein in the first horizontal period, the first gate line and the second gate line supply a same signal, and the first sensing line and the second sensing lines supply a same signal.

15. The method of driving the display device of claim 12, wherein the third period includes a 3-1th period and a 3-2th period in the second horizontal period, the fourth period includes a 4-1th period and a 4-2th period in the second horizontal period, the first gate line and the first sensing line supply signals to the first pixel and the second pixel in each of the 3-1th period and the 4-1th period, the second gate line and the second sensing line supply signals to the third pixel and the fourth pixel in each of the 3-2th period and the 4-2th period.

* * * * *